Sept. 22, 1964 G. C. NORDEEN 3,149,435
FISHING GEAR TO POSITION FISHHOOK AND LINE
IN SELECTED FISHING AREA
Filed May 29, 1963 3 Sheets-Sheet 2

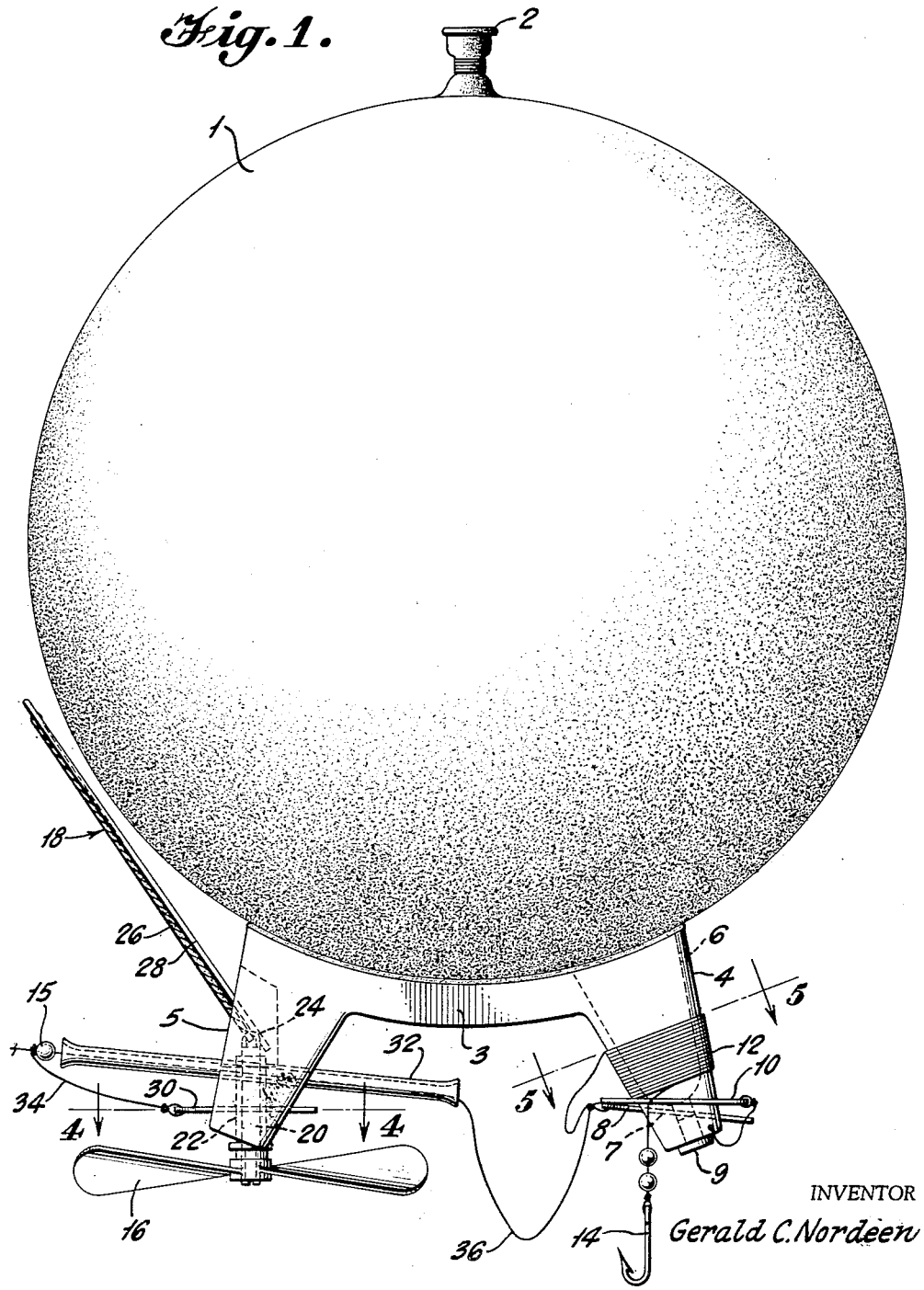

INVENTOR
Gerald C. Nordeen

BY Stevens, Davis, Miller & Mosher
ATTORNEYS

Sept. 22, 1964　　　G. C. NORDEEN　　　3,149,435
FISHING GEAR TO POSITION FISHHOOK AND LINE
IN SELECTED FISHING AREA
Filed May 29, 1963　　　　　　　　　3 Sheets-Sheet 3

INVENTOR
Gerald C. Nordeen

BY Stevens, Davis, Miller & Mosher
ATTORNEYS

United States Patent Office 3,149,435
Patented Sept. 22, 1964

3,149,435
FISHING GEAR TO POSITION FISHHOOK AND LINE IN SELECTED FISHING AREA
Gerald C. Nordeen, Baltimore County, Md.
(Rte. 16, Box 213, Baltimore, Md.)
Filed May 29, 1963, Ser. No. 284,098
2 Claims. (Cl. 43—43.11)

This invention relates to a fishing float.

It is an object of this invention to provide a float which can position a fishing hook in a selected fishing area.

It is a further object of the invention to provide a float which can position a fishing hook in a selected fishing area and maintain the hook at a desired depth.

I accomplish the objects of this invention by applying a propulsion means to move the float to the desired area and then operating a release mechanism by jerking the line to allow the hook to sink to the desired depth.

In a second form of the invention I do not use a propulsion means, but rely on wind, current, and skill in handling the fishing line to move the float to the desired fishing area.

An understanding of the invention can be had by reference to the following detailed description when considered in conjunction with the accompanying drawings, wherein:

FIG. 1 shows the assembled device with the line wound on the support and the motor held to prevent operation;

Figure 3:
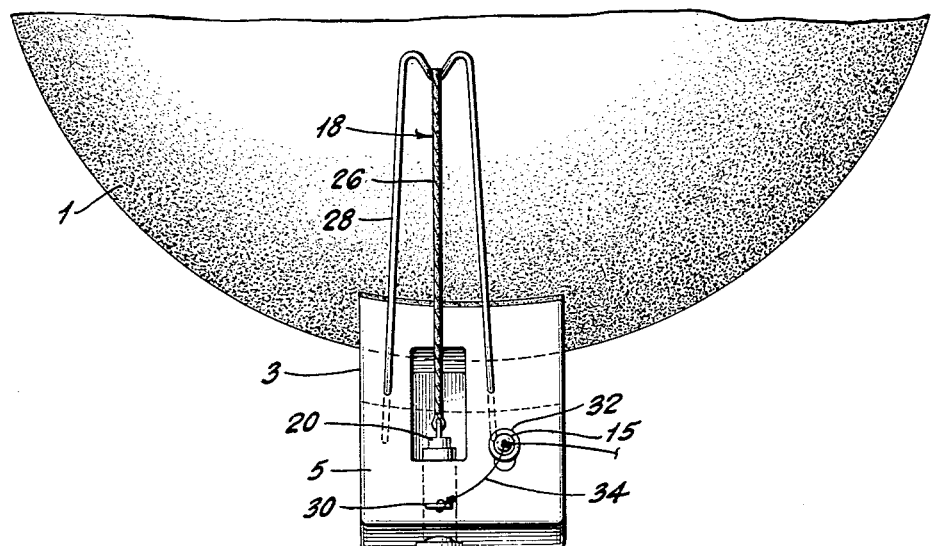
FIG. 3 shows an end view taken in the direction of the arrow A in FIG. 2.
Figure 2:
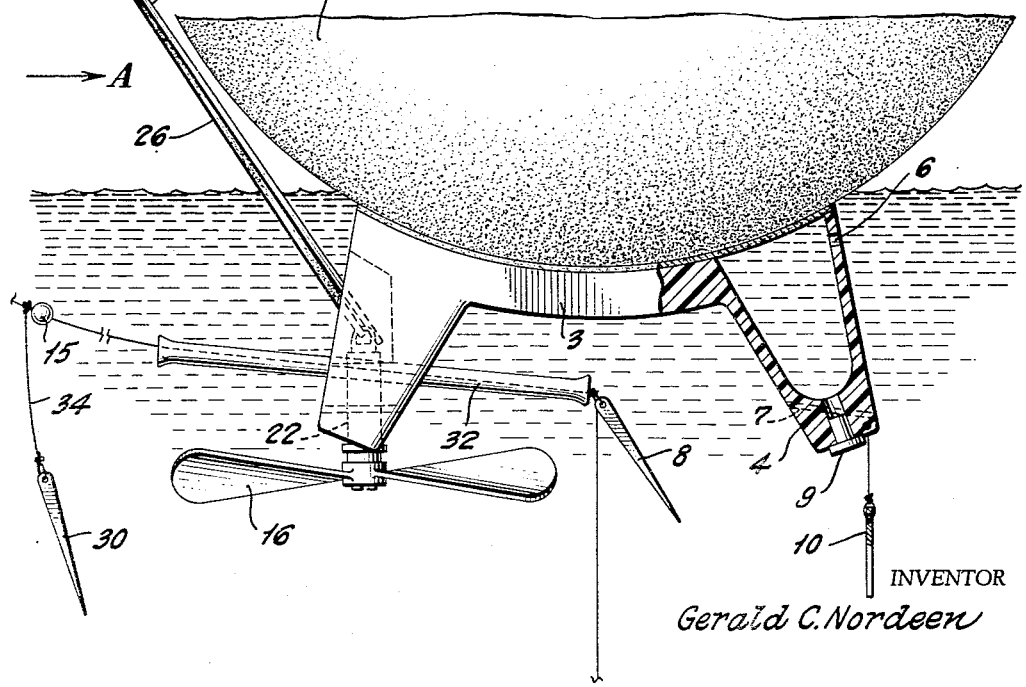
FIG. 2 shows the pins removed with the float in the fishing area.

In FIG. 1 is shown a float in the form of a balloon 1 of rubber or other suitable material provided with an inflating opening 2 whereby the balloon may be inflated with any suitable gas. Secured to the balloon by any suitable adhesive is a U-shaped support 3 having tapered legs 4 and 5. The leg 4 is hollow and is provided with an opening 6 for the entrance of water to provide ballast and a removable plug 9 for draining the water. The leg is also provided with an opening 7 to receive a pin 8. A washer 10 is supported on the leg by the pin and a wound portion 12 of the line is retained on the leg by the washer. When pin 8 is removed by jerking on the line, secured thereto at 8′, the washer drops off the leg as shown in FIG. 2, the line is allowed to unwind, and the hook 14 sinks to a preselected depth depending on the amount of line in the wound portion and on the position of an adjustable stop 15 mounted on the line.

Figure 4:
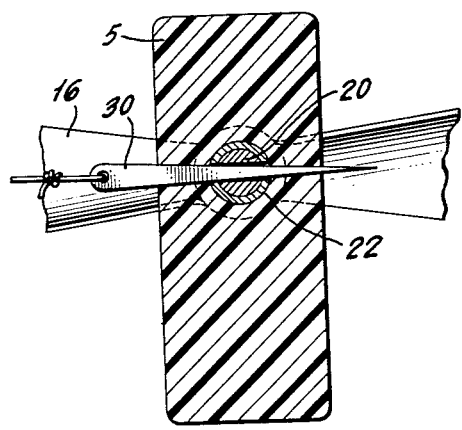
FIG. 4 is a section taken on the line 4—4 of FIG. 1.
Figure 5:
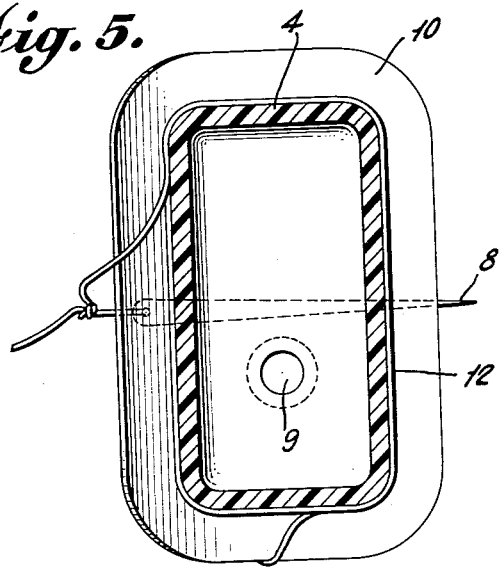
FIG. 5 is a section taken on the line 5—5 of FIG. 1.

Leg 5 supports a propeller 16 and an elastic band motor 18 for driving the propeller. The propeller is mounted on a shaft 20 supported in a bearing member 22 and the shaft is provided with an opening 24 for receiving an elastic band 26. A frame 28 supports one end of the elastic band and comprises two legs secured to leg 5 and a U portion joining the legs. The band is wound by turning the propeller and is prevented from unwinding by means of a pin 30 fitted through aligned openings in the leg, shaft, and bearing, as shown in FIG. 4. Pins 8 and 30 are of wood or other suitable material and of a size to pass freely through tube 32 in order that the hook may be raised to the tube and that stop 15 may abut the tube if it is positioned on the opposite side of line 34 from that shown on the drawing.

A short length of line 34 connects pin 30 with the fishing line whereby the elastic band can drive the propeller merely by jerking on the line to withdraw the pin. A loop portion 36 of the fishing line is of sufficient length to allow removal of pin 30 without removing pin 8. The line must be jerked a second time to remove pin 8.

In order to prevent the fishing line from becoming fouled with the propeller, a guide tube 32 is mounted in leg 5 and the line is passed through the tube.

Figure 6:
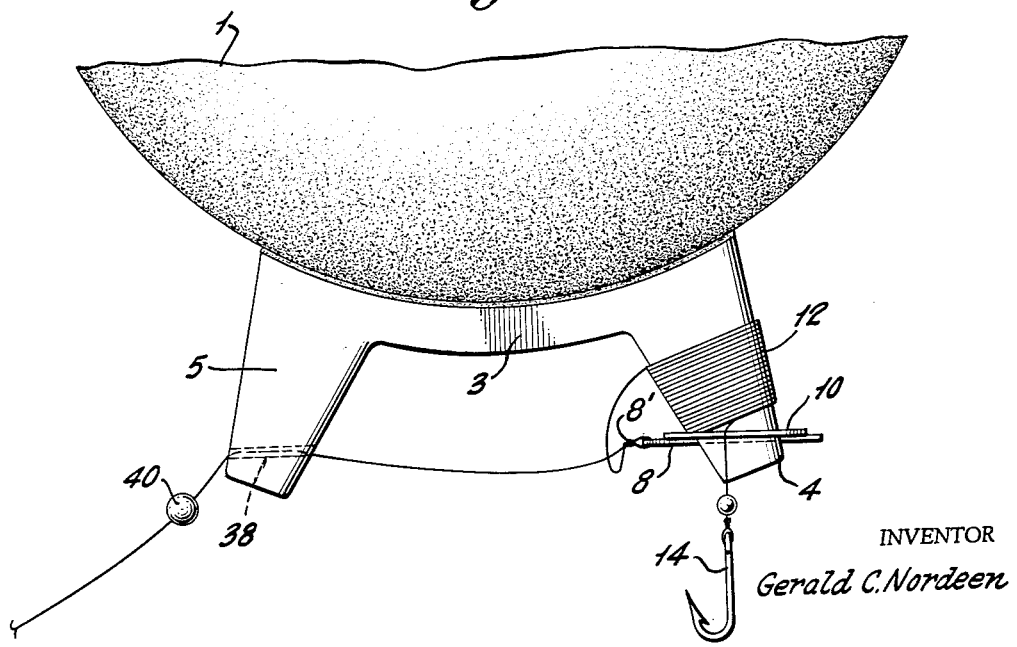
FIG. 6 is a view of a second embodiment.

In FIG. 6 is shown a second embodiment of the invention, wherein similar parts have been assigned the same numerals. In this embodiment, the elastic band motor and propeller have been omitted and the fishing line is passed through an opening 38 and supplied with a line drop stop 40, adjustably mounted on the line and set at the desired drop of the hook. When pin 8 is removed by jerking on the line, the hook sinks until stop 40 abuts leg 5.

Various modifications and changes can be made without departing from the spirit of the invention and I therefore do not wish to be confined to the details shown in my preferred embodiment.

I claim as my invention:

1. Fishing gear to position a fishhook and line in a selected fishing area comprising a float, a U-shaped support secured to the float, a length of fishing line wound on one of the legs of the U, a fishhook secured to the end of the line, a washer fitted on the leg of the U to retain the fishing line thereon, a pin fitted in an opening in said one leg to retain the washer on the leg, and means for removing the pin whereby the washer is allowed to drop off the leg and the line is released to unwind and permit the hook to sink to a depth determined by the length of line wound on the leg.

2. Fishing gear to position a fishhook and line in a selected fishing area comprising a balloon, a U-shaped support secured to the balloon, a length of fishing line wound on a leg of the U, a fishhook secured to the end of the line, a washer fitted on said leg of the U to retain the fishing line thereon, a pin fitted in an opening in said one leg to retain the washer on the leg, and means securing the pin to the fishing line whereby a jerk on the line can remove the pin.

References Cited in the file of this patent

UNITED STATES PATENTS

| 726,021 | Bryan | Apr. 21, 1903 |
| 1,740,521 | Nelson | Dec. 24, 1929 |
| 2,479,642 | Schiffman | Aug. 23, 1949 |
| 2,677,208 | Newton | May 4, 1954 |
| 2,709,316 | McCabe | May 31, 1955 |
| 2,720,720 | Landrum | Oct. 18, 1955 |
| 2,845,742 | Skillman | Aug. 5, 1958 |
| 2,910,798 | Bias | Nov. 3, 1959 |

FOREIGN PATENTS

| 318,685 | France | July 2, 1902 |